United States Patent [19]

Wetmore

[11] 4,363,364

[45] Dec. 14, 1982

[54] PLOW CHISEL WITH POINTED SHANK HAVING POINTED CHISEL CAP SECURED THERETO BY WELD

[75] Inventor: Halsey J. Wetmore, Guymon, Okla.

[73] Assignee: Adams Hard-Facing Company, Inc., Guymon, Okla.

[21] Appl. No.: 269,406

[22] Filed: May 29, 1981

[51] Int. Cl.$^3$ .............................................. A01B 15/02
[52] U.S. Cl. .................................... 172/732; 172/745; 172/747; 172/772; 76/DIG. 4
[58] Field of Search ............... 172/708, 719, 721, 732, 172/745, 747, 753, 749, 772; 76/DIG. 4, DIG. 11

[56] References Cited

U.S. PATENT DOCUMENTS 484,758 10/1892 Sears .................................. 172/745 X
604,205 5/1898 Crobarger ............................ 172/732
2,806,336 9/1957 Anderson ............................ 172/708

FOREIGN PATENT DOCUMENTS 47-11567 11/1972 Japan ............................ 76/DIG. 11

Primary Examiner—Richard T. Stouffer
Attorney, Agent, or Firm—William R. Laney

[57] ABSTRACT

A plow chisel having an integrated chisel point and including an elongated, arcuate shank portion formed as a curved, flat metal plate having a top surface, bottom surface and two opposed side edges. At one end, the shank portion is pointed due to convergence of the side edges. A chisel cap of pointed configuration includes a base relieved to receive the pointed end of the shank portion in a recess of complementary shape. The cap is of hard metal construction and is secured to the shank portion by welding.

3 Claims, 5 Drawing Figures

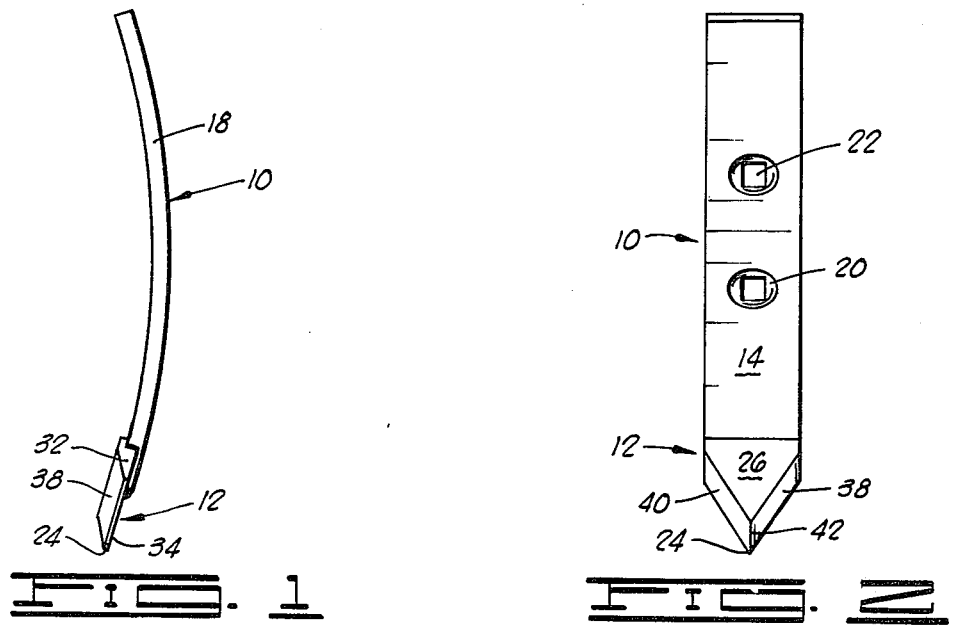
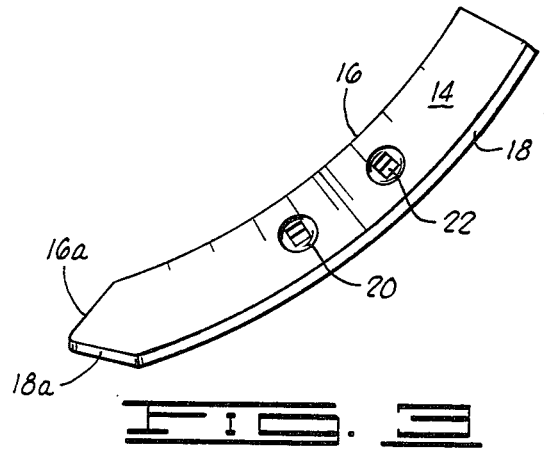
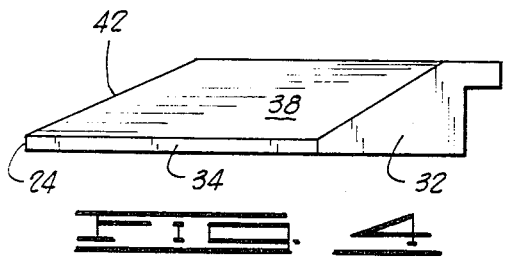
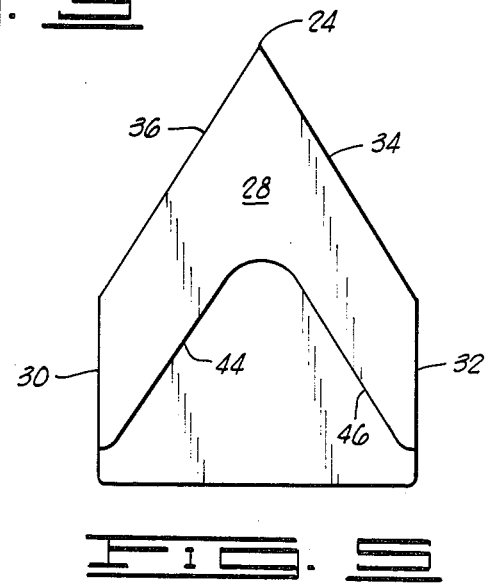

PLOW CHISEL WITH POINTED SHANK HAVING POINTED CHISEL CAP SECURED THERETO BY WELD

BACKGROUND OF THE INVENTION

1. Field of the Invention

This invention relates to agricultural implements, and more particularly to a plow chisel.

2. Brief Description of the Prior Art

A number of types of chisel plows have been heretofore devised which are intended to penetrate deeply into the earth so as to break up the hardpan layer in the earth and permit moisture penetration. Such chisel plows generally have an elongated curved shank portion and a sharp point at the lower end of this shank portion which is adapted to penetrate deeply into the earth and break through the hardpan layer.

In the types of chisel plows heretofore known, abrasion and wear of the points of the chisels has presented a problem of shortened service life in such devices, requiring replacement or hard facing after a relatively short period of hard usage.

Examples of types of plowing devices heretofore in use as such have been known, and are believed to be closest in concept to the present invention are the chisels manufactured by Adams Hard-Facing Company of Guymon, Okla. and illustrated in the Adams 1979 Catalog (copy sumbitted separately), the subsoil attachment for plows shown in U.S. Pat. No. 680,400, the chisel shank and caps shown in British Patent Specification No. 785,825, the hollow tip for a cultivator tine shown in Lenke U.S. Pat. No. 3,439,636, and the soil injector spear point disclosed in Hannibal U.S. Pat. No. 2,598,121.

BRIEF DESCRIPTION OF THE PRESENT INVENTION

The present invention provides an improved plow chisel of generally two-part construction, including an elongated arcuate shank and a chisel point or cap placed on one end of this shank. The elongated arcuate shank is formed as a curved, flat metal plate having a top surface, a bottom surface, and two opposed side edges. At one end the shank portion is pointed due to a convergence of the side edges. The chisel cap is also of pointed configuration and includes a base which is relieved to receive the pointed end of the shank portion in a recess which is of complementary shape to the pointed end of the shank portion. The cap is of hard metal construction, such as chromium carbide, and is welded to the shank portion after interfitting of the cap on the shank portion.

An important feature of the present invention is the ease with which a very hard point or cap may be placed on the lower end of a plow chisel so as to impart extended service life and enhanced abrasion resistance to this plow chisel.

Another important object of the invention is to provide a compact, easily used and constructed plow chisel which is mechanically durable and can be easily mounted and used by the farmer.

Additional objects and advantages of the invention will become apparent as the following detailed description is read in conjunction with the accompanying drawings which illustrate a preferred embodiment of the invention.

BRIEF DESCRIPTION OF THE DRAWINGS

FIG. 1 is a side elevation view of a plow chisel constructed in accordance with the present invention.

FIG. 2 is a front elevation view of the plow chisel shown in FIG. 1.

FIG. 3 is a perspective view of the shank portion of the plow chisel of the invention.

FIG. 4 is a side elevation view of the chisel cap, forming a part of the plow chisel of the invention.

FIG. 5 is a bottom plan view of the chisel cap shown in FIG. 4.

DETAILED DESCRIPTION OF A PREFERRED EMBODIMENT OF THE INVENTION

Referring initially to FIG. 1 in the drawings, the plow chisel of the invention includes an elongated, arcuate shank portion designated generally by reference numeral 10 and a chisel cap or point, designated generally by reference numeral 12. The shank portion is a curved metal plate having an upper surface 14. A lower surface (not visible) and two opposed, substantially parallel side edges 16 and 18. Intermediate its length, a pair of bolt apertures 20 and 22 are provided through the shank portion to enable the shank portion to be affixed to a supporting structure on a plow frame. At its lower end, the shank portion is pointed with the point thereon being formed by convergance of the side edges 16 and 18 as illustrated at 16a and 18a.

The chisel cap 12 is preferably constructed of a very hard material, such as chromium carbide, and includes a tip or point 24, a base portion at the opposite side thereof from the tip, an upper surface 26 and a lower surface 28 which extends substantially parallel to the upper surface. The cap further includes a pair of opposed, substantially parallel rear side surfaces 30 and 32, and a pair of reduced width, forward side surfaces 34 and 36. A pair of beveled or inclined surfaces 38 and 40 are provided along the forward portion of the chisel cap 12 and project upwardly from the forward side surfaces 34 and 36. The beveled surfaces 38 and 40 converge at an inclined upper, forward edge 42 which slopes downwardly to the point 24.

The lower surface 28 of the chisel cap 12 is relieved at the base portion in the manner shown in FIG. 5. The relief in the chisel cap is basically configured so as to accommodate the pointed lower end of the shank portion 10 defined by the convergence of the side edges 16 and 18. The relief in the lower surface 28 of the chisel cap 12 is substantially complementary in configuration to the pointed lower end of the shank portion 10, thus being generally triangular in configuration and having a pair of convergent sides 44 and 46. The relief is cut to a depth in the chisel cap, as measured from the lower surface 28 toward the upper surface 26 thereof, which is slightly less than the thickness of the shank portion 10, and this relationship is illustrated in FIG. 1 of the drawings.

In the construction of the plow chisel of the invention, the chisel cap 12 is fitted upon the lower end of the shank portion 10 and is welded in that location by means of a weld metal having a high degree of hardness and abrasion resistance. The interfitting of the configuration of the lower end of the shank portion 10 with the relief formed in the chisel cap 12 assures a strong solid connection when the welding is completed.

The plow chisel of the invention is characterized in having a long or extended and trouble-free service life.

While the chisel cap is very abrasion-resistant and retains its penetrating and cutting function for a long period of time, it can be easily replaced if it should be lost from the lower end of the shank portion. The entire plow chisel is quickly and easily attached to a supporting member carried on a plow frame, and can be detached and replaced easily.

Although a preferred embodiment of the invention has been illustrated herein, in order to provide an understanding and comprehension of the basic principles which underlie the invention, it will be understood that various changes and modifications can be effected in the illustrated embodiment without departure from such basic principles. Changes and innovations of that type are therefore deemed to be circumscribed by the spirit and scope of the invention as defined by the appended claims or reasonable equivalence thereof.

What is claimed is:

1. A plow chisel comprising:
   an elongated arcuate shank portion having opposed parallel side edges and having a point at one end thereof formed by the convergence of said side edges;
   a pointed chisel cap including a relieved base portion defining a recess complementary in configuration to, and receiving, the point of said shank portion, said chisel cap further including:
   a pointed tip on the opposite end thereof from said base portion;
   an upper surface;
   a lower surface which extends substantially parallel to the upper surface and having a relief therein forming the recess in the base portion, said relief having a configuration complementary to the configuration of the point of said shank portion and having a depth, as measured from said lower surface toward the upper surface, which is less than the thickness of said shank portion whereby said shank portion projects to a location below said lower surface;
   a pair of opposed, substantially parallel rear side surfaces disposed on opposite sides of the recess and extending between the upper surface and the lower surface;
   a pair of convergent forward side surfaces each extending normal to the lower surface and projecting upwardly therefrom and extending from the rear side surfaces to the tip; and
   a pair of convergent beveled surfaces projecting upwardly from the forward side surfaces to the upper surface and inclined toward each other and meeting in a line of convergence at an upper forward edge inclined at an acute angle to said lower surface; and
   weld metal in the angular corner space defined between said shank portion and the lower surface of said chisel cap for securing said chisel cap to said shank portion.

2. A plow chisel as defined in claim 1, wherein said cap is constructed of chromium carbide.

3. A plow chisel as defined in claim 1 wherein a portion of said chisel cap, including said upper surface, extends above said chisel cap recess.

* * * * *